US011296979B2

United States Patent
Lo

(10) Patent No.: US 11,296,979 B2
(45) Date of Patent: Apr. 5, 2022

(54) METHOD AND SYSTEM FOR SYMMETRIC INTEGRATED ROUTING AND BRIDGING

(71) Applicant: Arista Networks, Inc., Santa Clara, CA (US)

(72) Inventor: Alton Lo, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 67 days.

(21) Appl. No.: 16/718,532

(22) Filed: Dec. 18, 2019

(65) Prior Publication Data
US 2020/0204480 A1    Jun. 25, 2020

Related U.S. Application Data

(60) Provisional application No. 62/782,328, filed on Dec. 19, 2018.

(51) Int. Cl.
| | |
|---|---|
| *H04W 56/00* | (2009.01) |
| *H04L 45/24* | (2022.01) |
| *H04L 45/64* | (2022.01) |
| *H04L 101/622* | (2022.01) |
| *H04L 61/5038* | (2022.01) |

(52) U.S. Cl.
CPC .......... *H04L 45/245* (2013.01); *H04L 45/64* (2013.01); *H04L 61/2038* (2013.01); *H04L 61/6022* (2013.01); *H04L 2212/00* (2013.01)

(58) Field of Classification Search
CPC ... H04L 45/245; H04L 45/64; H04L 61/2038; H04L 61/6022; H04L 2212/00
USPC ........................................................ 370/401
See application file for complete search history.

(56) References Cited

U.S. PATENT DOCUMENTS

| | | | |
|---|---|---|---|
| 8,787,149 B1 * | 7/2014 | Ramanathan ........... | H04L 45/66 370/216 |
| 2011/0026439 A1 * | 2/2011 | Rollins ............. | H04L 29/12783 370/258 |
| 2015/0195178 A1 * | 7/2015 | Bhattacharya ........ | H04L 45/745 718/1 |
| 2017/0171057 A1 * | 6/2017 | Dong ....................... | H04L 45/02 |
| 2017/0310548 A1 * | 10/2017 | Jailani ................ | H04L 41/0806 |

* cited by examiner

*Primary Examiner* — Sai Ming Chan
(74) *Attorney, Agent, or Firm* — Chamberlain, Hrdlicka, White, Williams & Aughtry

(57) ABSTRACT

In general, embodiments of the invention relate to managing the processing of network data units (NDUs) received by a network device. More specifically, embodiments of the invention relate to minimize the use of a peer link between two multichassis link aggregation group (MLAG) peers to transmit NDUs that are to be routed or bridged by the MLAG peers. The aforementioned minimization of the use of the peer link may be achieved, e.g., using a shared media access control (MAC) address.

13 Claims, 5 Drawing Sheets

METHOD AND SYSTEM FOR SYMMETRIC INTEGRATED ROUTING AND BRIDGING

CROSS REFERENCE TO RELATED APPLICATIONS

This patent application claims the benefit of U.S. Provisional Patent Application Ser. No. 62/782,328 filed on Dec. 19, 2018 under 35 U.S.C. § 119(e). U.S. Provisional Patent Application Ser. No. 62/782,328 is incorporated herein by reference in its entirety.

BACKGROUND

It is critical that network infrastructure be resilient in order to ensure that data is able to be communicated on the network infrastructure. Network engineers typically take various approaches for ensuring that the network infrastructure continues to enable data communication even when various portions of the network infrastructure are not operating correctly.

DETAILED DESCRIPTION

Figure 1:
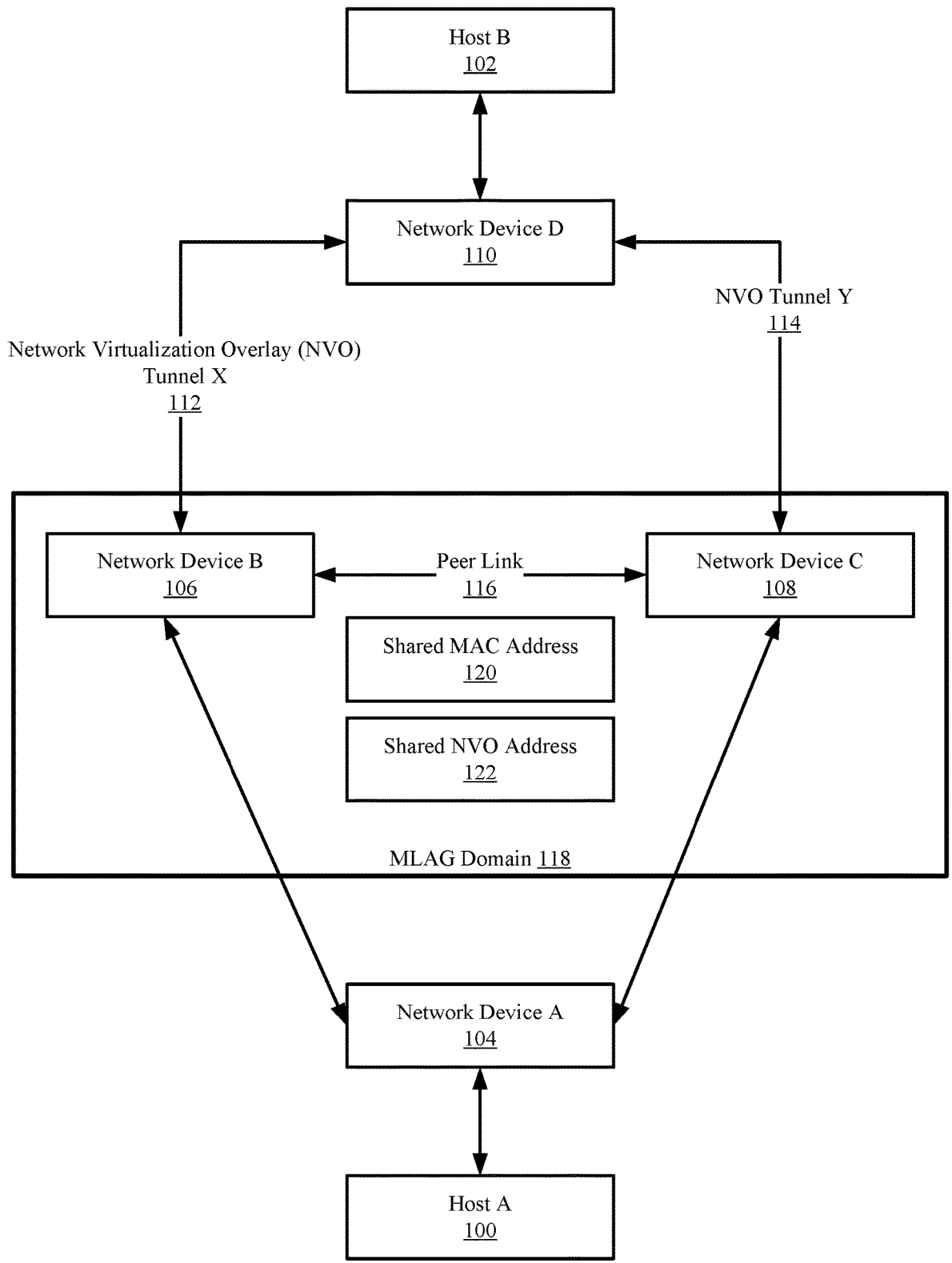
FIG. 1 shows a system in accordance with one or more embodiments of the invention.

Specific embodiments will now be described with reference to the accompanying figures. In the following description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments of the invention relate to managing the processing of network data units (NDUs) received by a network device. More specifically, embodiments of the invention relate to minimize the use of a peer link between two multichassis link aggregation group (MLAG) peers to transmit NDUs that are to be routed or bridged by the MLAG peers. The aforementioned minimization of the use of the peer link may be achieved, e.g., using a shared media access control (MAC) address. The shared MAC address may be published/advertised by all MLAG peers in a MLAG domain. In this manner, when a NDU is received by a MLAG peer, the inner destination MAC address is the shared MAC address. By using the shared MAC address as the destination MAC address of the NDU, the MLAG peer may performing the routing and bridging locally (as opposed to using transmitting the NDU to a second MLAG peer via the peer link, where the second MLAG peer performs the routing and bridging). By minimizing the bandwidth used by the peer link, the MLAG peers in the MLAG domain may focus the use of their bandwidth on transmitting NDUs to network devices (and/or hosts) that are external to the MLAG domain.

The following provides a non-limiting example of a scenario in which embodiments of the invention reduce the use of a peer link between a first and second MLAG peer in a MLAG domain. Turning to the example, consider a scenario in which there is a network device (N1) connected to MLAG Peer A (MPA) and MLAG Peer B (MPB) in a MLAG domain. Prior to implementing embodiments of the invention, MPA and MPB may publish a route reachability message (e.g., a Type 5 route) that specifies their own unique MAC addresses. In this scenario, after the aforementioned publishing, an encapsulated NDU (e.g., a virtual extensible local area network (VXLAN) frame) may be received by MPA, where the outer destination IP address is a VXLAN tunnel endpoint (VTEP) IP address, the inner destination MAC address is a MAC address of MPB, and the inner destination IP address is associated with a host (H) connected to N1.

The VTEP in MPA will decapsulate the encapsulated NDU because the outer destination IP address is the VTEP IP address. However, MPA (which includes a route to H via N1) will not perform the route look-up because the inner destination MAC address is a MAC address of MPB. Thus, MPA will transmit the NDU via the peer link to MPB. MPB will then perform the route look-up and bridge the NDU to N1.

When embodiments of the invention are implemented, both MPA and MPB publish a route reachability message (e.g., a Type 5 route) that specifies shared MAC address. Thus, when an encapsulated NDU (e.g., VXLAN) frame) is received by MPA, the outer destination IP address is the VTEP IP address, the inner destination MAC address is the shared MAC address, and the inner destination IP address is associated with a host (H) connected to N1.

The VTEP in MPA will decapsulate the encapsulated NDU because the outer destination IP address is the VTEP IP address. Further, MPA will be able to perform the route look-up because the inner destination MAC address is the shared MAC address. Thus, MPA will perform the route look-up and bridge the NDU to N1. Thus, the NDU does not need to be transmitted to MPB via the peer link.

FIG. 1 shows a system in accordance with one or more embodiments of the invention. The system includes one or more network devices (104, 106, 108, 110) operatively connected via a network using zero, one or more network overlay virtualization (NVO) tunnels (112, 114). The system further includes hosts (100, 102), each of which may be directly connected to one or more network devices (104, 110). Each of these components is described below.

In one or more embodiments, a network device (e.g., 104, 106, 108, 110) includes functionality to receive NDUs (e.g., frames, packets, tunneling protocol frames, etc.) at any of the physical network interfaces (i.e., ports) of the network device and to process the NDUs. In one or more embodiments, processing a NDU includes using NDU processing information. The NDU processing information includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network data unit); (ii) whether to mirror the network data unit; and/or (iii) determine how to route/forward the network data unit in order to transmit the network data unit from an interface of the network device.

In one or more embodiments, a network device also includes and/or is operatively connected to device persistent storage and/or device memory (i.e., non-transitory computer readable mediums used to provide persistent storage resources and/or memory resources) storing software and/or firmware.

Such software and/or firmware may include instructions which, when executed by the one or more processors) of a network device, cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (e.g., 104, 106, 108, 110) is part of a network. A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network devices 104, 106, 108, 110)) that facilitate network connectivity for one or more operatively connected devices (e.g., computing devices (e.g., hosts), data storage devices, other network devices, etc.). In one or more embodiments, the network device and other devices within the network (not shown) are arranged in a network topology (see e.g., FIG. 1). In one or more embodiments, a network topology is an arrangement of various elements of a network.

In one or more embodiments, a computing device is any device (e.g., a host) or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

In one embodiment of the invention, the network devices (106, 108, 110) transmit NDUs (which may be encapsulated NDUs) via one or more NVO tunnels (112, 114). NVO tunnels (112, 114) may use an Internet Protocol (IP) encapsulation, where the source IP address in the encapsulated NDU identifies a source network device that is performing the encapsulation of the NDU and the destination IP address in the encapsulated NDU identifies a destination network device that is performing the decapsulation of the encapsulated NDU. Non-limiting examples of IP encapsulation protocols that may be used for IP encapsulation include virtual extensible local area network (VXLAN) protocol, and Network Virtualization Using Generic Routing Encapsulation (NVGRE). The invention is not limited to the aforementioned protocols.

In one embodiment of the invention, network device B (106) and network device C (108) are members of a MLAG domain (118). In one embodiment of the invention, the MLAG domain (118) includes a pair of MLAG peers, where each of the MLAG peers is a network device (106, 108). Each physical network interface (e.g., port) (not shown) on a network device may be connected to either: (i) a MLAG peer or (ii) an external device (e.g., another network device (104, 110), a host (e.g., 100, 102), etc.). Physical network interfaces connected to a MLAG peer may be referred to as peer physical network interfaces while physical network interfaces not connected to the MLAG peer may be referred to as non-peer physical network interfaces.

With respect to the peer physical network interfaces, each MLAG peer may include one or more peer physical network interfaces, where the peer physical network interfaces on one MLAG peer are connected (e.g., via a wired connection) to the peer physical network interfaces on the other MLAG peer. The result is one or more physical links between the MLAG peers. These links may be collectively referred to as a peer link (116). The peer link (116) may be established and/or active when at least one physical link that is part of the peer link is active. The physical link is considered to be active when peer physical network interfaces on each side of the physical link are active.

In one embodiment of the invention, each external device (e.g., 104) may be a singly-connected device or a dually-connected device. A singly-connected device is only connected to a single peer physical network interface on one of the MLAG peers (see e.g., 106 or 108). A dually-connected device is connected to at least one peer physical network interface on each of the MLAG peers in the MLAG domain (e.g., 106 and 108). If an external device is dually-connected, then the peer physical network interfaces on the external device that are connected to the MLAG domain in order to make the external device a dually-connected device are collectively referred to as a link aggregation group (not shown).

In one embodiment of the invention, to external devices that are dually-connected devices, the MLAG domain appears as a single network device. For example, from the perspective of network device A (106), the MLAG domain appears as a single network device.

The MLAG peers in the MLAG domain share routing and bridging information via the peer link such that the MLAG peers have synchronized routing and bridging information. Thus, routing and bridging information learned on one MLAG peer is provided to the other MLAG peer and vice versa.

In one embodiment of the invention, each of the MLAG peers implements NVO tunnel endpoint, e.g., a VTEP (not shown). The NVO tunnel endpoint is associated with a shared NVO address (122), e.g., a shared VTEP IP address or anycast VTEP IP address. Similarly, each of the MLAG is associated with their own MAC addresses as well as a shared MAC address (120). The shared MAC address may be generated as described below with respect to FIG. 2.

In one embodiment of the invention, a host (100,102) may be any type of system (e.g., software and computer hardware) that is configured to generate, send, receive, and/or process requests and replies either locally or over a network using software and computer hardware. A host (100,102) may include one or more processor(s), memory, and one or more physical network interface(s). Further, a host (100, 102) may include functionality to generate, receive, and/or transmit NDUs. Examples of a host (100,102) include, but are not limited to, a server (e.g., a database server, a dynamic host configuration protocol (DHCP) server, an application server, a file server, a print server, a mail server, or any other server), a desktop computer, a mobile device (e.g., a laptop computer, a smart phone, a personal digital assistant, a tablet computer, or any other mobile device), or any other type of computing device with the aforementioned minimum requirements.

While FIG. 1 shows a configuration of components, other system configurations may be used without departing from the scope of the invention.

Figure 2:
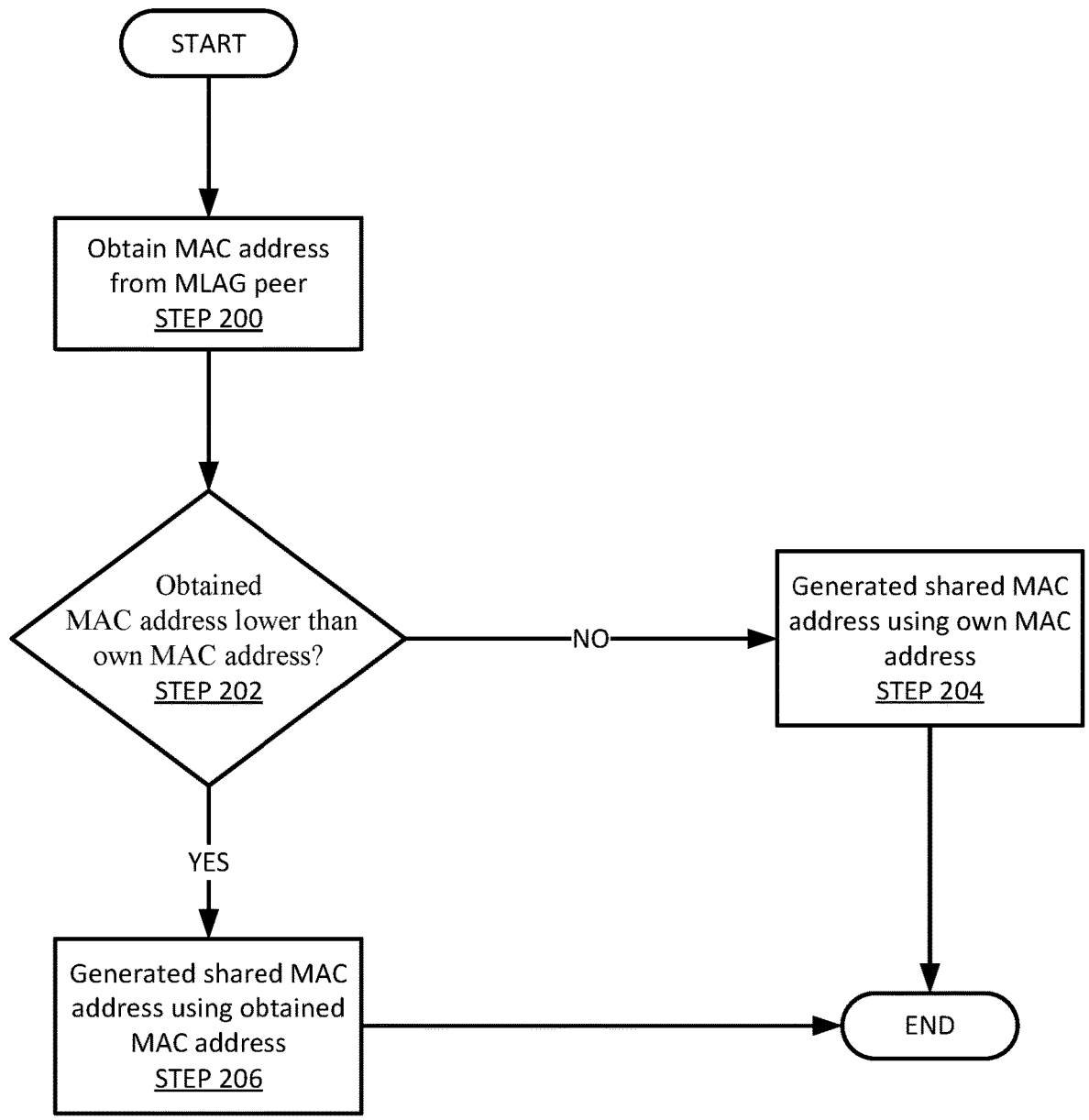
FIG. 2 shows a flowchart for generating a shared media access control (MAC) address in accordance with one or more embodiments of the invention.

FIG. 2 shows a flowchart for generating a shared media access control (MAC) address in accordance with one or more embodiments of the invention. The method shown in FIG. 2 may be performed by a network device. Further, the method shown in FIG. 2 is performed independently by each network device in the MLAG domain.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, a MAC address is obtained from a MLAG peer. The MAC address, which may also be referred to as a system MAC, may be obtained using any known or later discovered mechanism. In one embodiment of the invention, a system MAC address is a unique MAC address that is permanently associated with the MLAG peer, e.g., by the manufacturer of the MLAG peer. The MAC address may be transmitted from the MLAG peer via the peer link.

In step 202, a determination is made about whether the obtained MAC address (i.e., the MAC address obtained in step 202) is lower (or numerically less) than the MAC address of the MLAG peer that is performing the method shown in FIG. 2. The invention is not limited to the aforementioned comparison. For example, in another embodiment of the invention, each of the aforementioned MAC addresses may be hashed using a hash function (or another function) and the resulting values may be compared. Other methods for comparing the MAC addresses may be used without departing from the invention. More specifically, any method may be used to deterministically select a given MAC address from a set of two (or more) MAC addresses. This allows multiple MLAG peers to independently perform the method shown in FIG. 2, where the performance of the method shown in FIG. 2 results in each of the MLAG peers independently generating the same shared MAC address.

Continuing with the discussion of Step 202, when the obtained MAC address is lower than their own MAC address (i.e., the MAC address of the MLAG peer that is performing step 202), then the process proceeds to step 206; otherwise, the process proceeds to step 204.

Those skilled in the art will appreciate that if another comparison mechanism is used, then the process may proceed to step 204 when their own MAC address (i.e., the MAC address of the MLAG peer that is performing step 202) is selected or may proceed to step 206 when the obtained MAC address is selected.

In step 204, their own MAC address (i.e., the MAC address of the MLAG peer that is performing step 204) is used to generate the shared MAC address. The generation of the shared MAC address may include modifying a pre-determined portion (e.g., a specific bit(s)) in the MAC address in a pre-defined manner (e.g., flipping the bit). In another embodiment of the invention, their own MAC address may be used as an input to a pre-determined function that performs a pre-defined modification of the MAC address to generate the shared MAC address. Any other pre-determined process may be used to generated the shared MAC address from the aforementioned MAC address without departing from the invention.

In step 206, the obtained MAC address is used to generate the shared MAC address. The generation of the shared MAC address may include modifying a pre-determined portion (e.g., a specific bit(s)) in the MAC address in a pre-defined manner (e.g., flipping the bit). In another embodiment of the invention, the obtained MAC address may be used as an input to a pre-determined function that performs a pre-defined modification of the obtained MAC address to generate the shared MAC address. Any other pre-determined process may be used to generate the shared MAC address from the obtained MAC address without departing from the invention.

In one embodiment of the invention, the same processing is performed on the selected MAC address in steps 204 and 206. Thus, the shared MAC address is generated in the same manner from which ever MAC address is selected at step 202.

The resulting shared MAC address is unique to the MLAG domain in which it was generated. In this context, the MLAG domain is a set of MLAG peers that are members of the MLAG domain. Thus, if the MLAG peers in the MLAG domain change, then method shown in FIG. 2 is performed for the new MLAG domain.

For example, the method shown in FIG. 2 may be performed each time a network device is added to a MLAG domain. For example, the method shown in FIG. 2 may be performed when a network device is added to a MLAG domain and when the network device is migrated from one MLAG domain to another MLAG domain. The method shown in FIG. 2 may be performed in response to other events without departing from the invention.

As discussed above, the method shown in FIG. 2 may be performed independently by the MLAG peers to each independently generate the same shared MAC address. In this manner, a given MLAG peer does not need to rely on another MLAG peer to generate the shared MAC address. This allows for more efficient generation and subsequent use of the shared MAC address by the MLAG peers in the MLAG domain.

Figure 3:
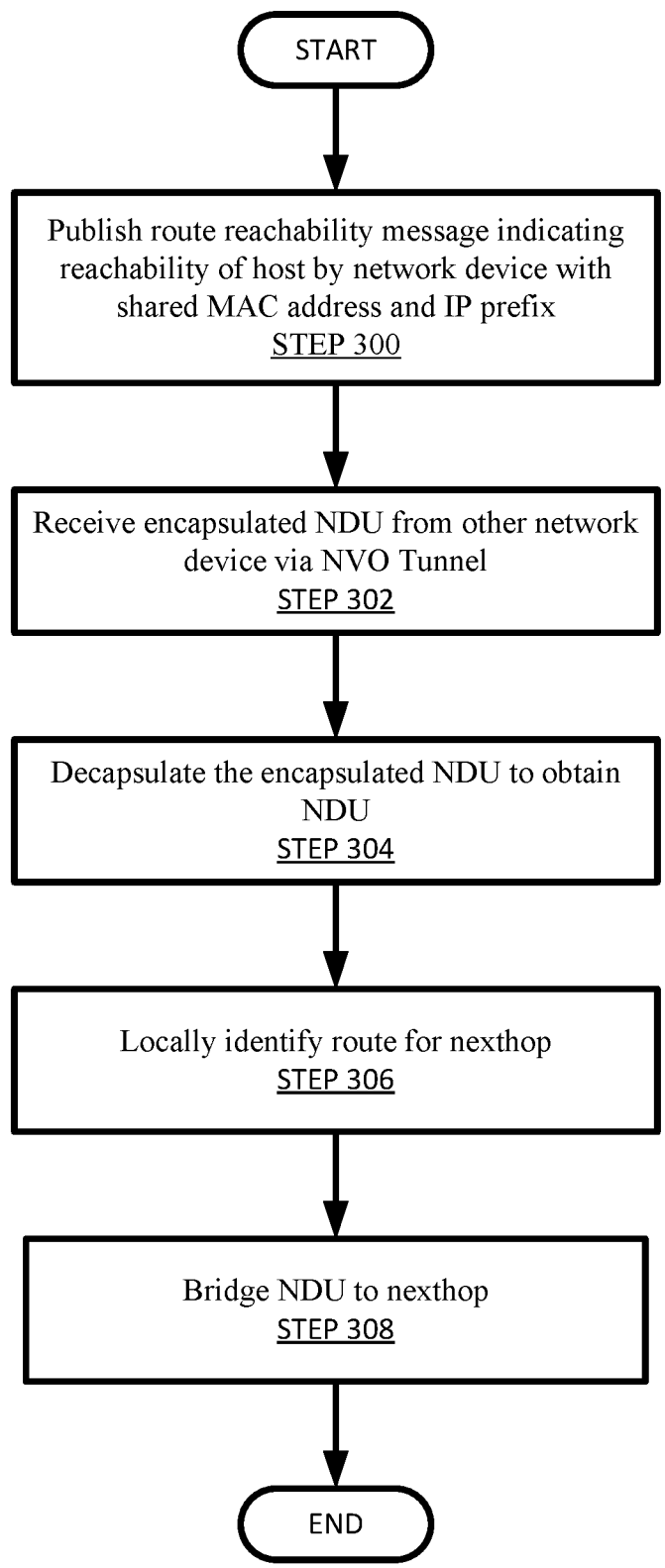
FIG. 3 shows a flowchart for processing network data units (NDUs) in accordance with one or more embodiments of the invention.

FIG. 3 shows a flowchart for processing network data units (NDUs) in accordance with one or more embodiments of the invention. The method shown in FIG. 3 may be performed on by a network device. Further, the method shown in FIG. 3 is performed independently by each network device in the MLAG domain.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 300, after the shared MAC address has been generated, a route reachability message specifying the shared MAC address, an IP prefix (e.g., an IP prefix for a host, e.g., 100, operatively connected to the MLAG domain), and the shared NVO address (e.g., an anycast VTEP IP address) is published. In one embodiment of the invention, the route reachability message is a Type 5 route that specifies the IP prefix, the shared MAC address (which may be implemented using the Router's MAC Extended Community attribute) and the shared NVO address. The specification of the shared MAC address in the Type 5 route signals to other network devices to use the shared MAC address as the inner destination MAC address of the NDU when sending an encapsulated NDU, destined to the IP prefix, to the MLAG domain.

After step 300 has been performed by the network device (or by another network device in the MLAG domain), step 302 may be performed. In step 302, an encapsulated NDU is received by the network device (e.g., Network Device A, FIG. 1) from another network device (e.g., Network Device D, FIG. 1) via a NVO tunnel (e.g., NVO Tunnel Y, FIG. 1).

In step 304, the network device decapsulates the encapsulated NDU to obtain the NDU. The specific decapsulation processing performed to obtain the NDU is based on the specific implementation of the NVO tunnel.

In step 306, the NDU is analyzed to determine the nexthop for the NDU. The analysis may include obtaining the destination IP address specified in the NDU and then using the routing and bridging information in the network device to determine a nexthop for the NDU. The network device may perform the analysis in Step 306 because the destination MAC address of the NDU is the shared MAC address. Because the network device is associated with the shared MAC address, network device determines the nexthop using the local routing and bridging information.

In step 308, the NDU is bridged to the nexthop (e.g., network device A, FIG. 1) via the egress port based on the nexthop.

Figure 4A:
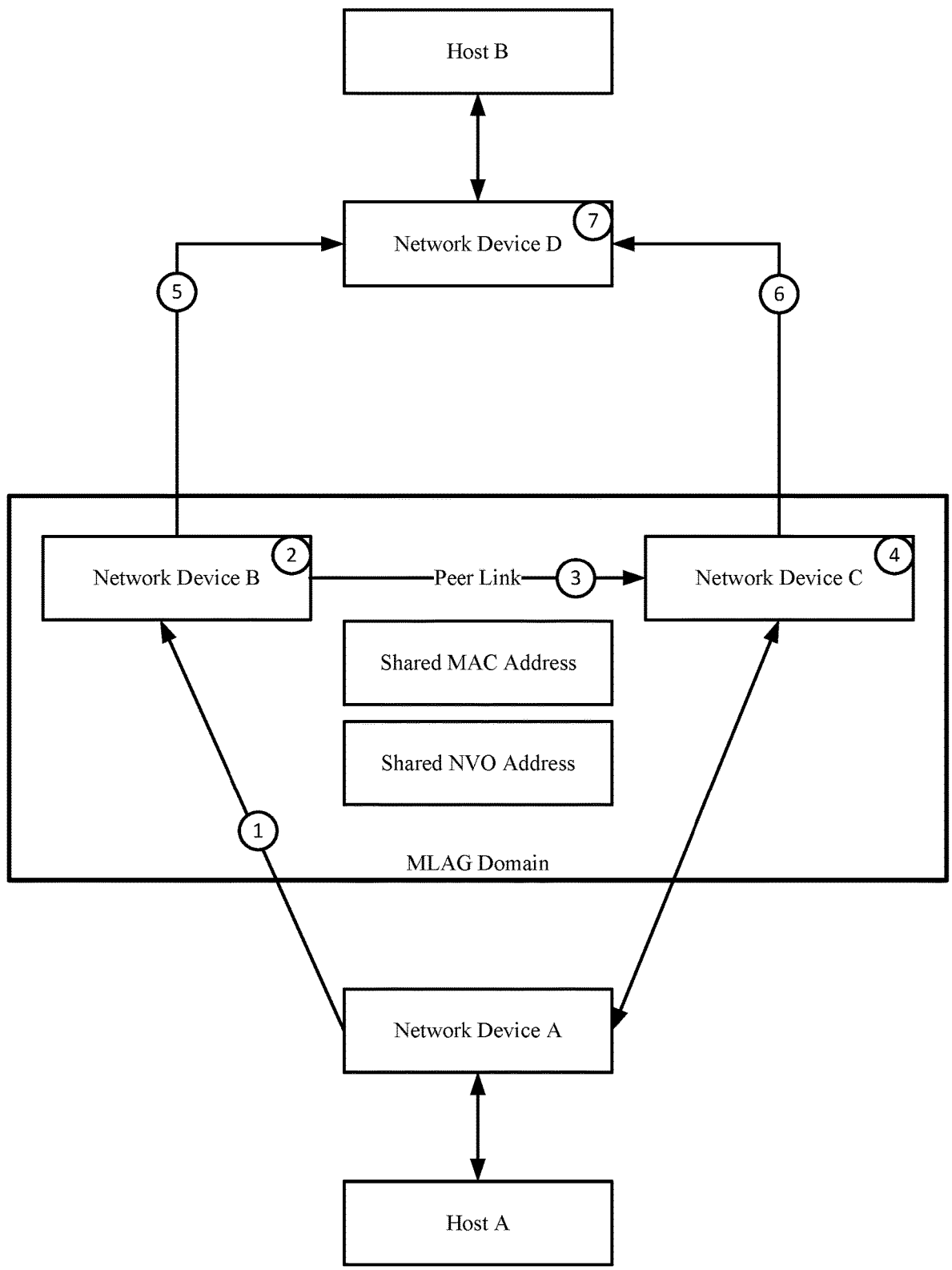
FIGS. 4A-4B show an example in accordance with one or more embodiments of the invention.
Figure 4B:
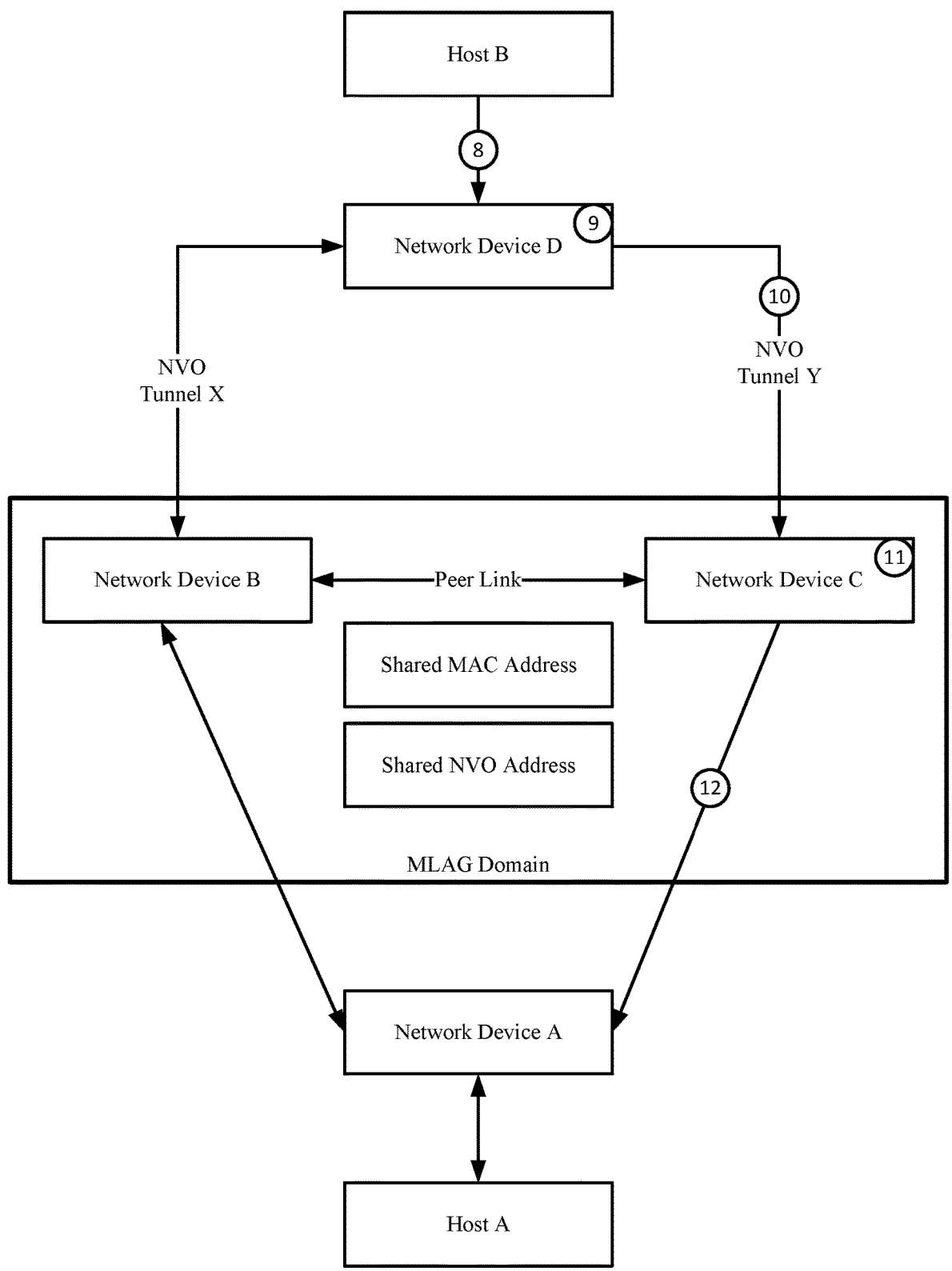

FIGS. 4A-4B show an example in accordance with one or more embodiments of the invention. The invention is not limited to the following example.

Referring to FIG. 4A, consider a scenario in which network device B and C are part of a MLAG domain and each of the network devices has independently generated a shared MAC address in accordance with the method shown in FIG. 2.

Turning to the example, assume that network device A learns the IP address of host A and publishes a route (which includes a corresponding IP prefix) to network device B [1]. Network device B subsequently stores the route (which includes an IP prefix) [2]. In addition, network device B shares the route, via the peer link, with network device C [3]. Network device C subsequently stores the route (which includes the IP prefix) [4]. At some later point in time, network device B publishes a type 5 route that includes the IP prefix, the shared MAC address, and the shared NVO address [5] and network device C publishes a type 5 route that includes the IP prefix, the shared MAC address, and the shared NVO address [6]. Network device D receives the two aforementioned routes and stores them for future use [7].

Referring to FIG. 4B, at some later point in time, host B issues a NDU destined for host A [8]. Network device D receives the NDU and, e.g., using equal-cost multi-path routing (ECMP), determines that the NDU may be transmitted towards the destination (i.e., host A) via either network device B or network device C. Network device D selects network device C, updates the inner destination MAC address for the NDU to the shared MAC address and then encapsulates the resulting NDU to generate an encapsulated NDU. The outer IP destination of the encapsulated NDU is a shared NVO address associated with the MLAG domain. [9] The encapsulated NDU is subsequently transmitted to network device C via NVO tunnel Y [10].

Upon receipt at network device C, the encapsulated NDU is decapsulated (i.e., because network device C is associated with shared NVO address, or more specifically, the NVO tunnel endpoint is associated with the shared NVO address) to obtain the NDU. Further, because the NDU has as its destination MAC address the shared MAC address, network device C uses its local routing and bridging information to identify a route (i.e., the route obtained in [3] in FIG. 4A) using the destination IP address (which is the IP address of Host A) in the NDU. [11] The route specifies the nexthop as network device A and the NDU is subsequently bridged to network device A. [12]

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing network data units (NDUs), the method comprising:
   generating, by a first multichassis link aggregation (MLAG) peer, a shared media access control (MAC) address, wherein generating, by the first MLAG peer, the shared MAC comprises:
      comparing a first MAC address associated with the first MLAG peer with a second MAC address associated with a second MLAG peer, and
      based on results of the comparison, selecting one of the first and second MAC addresses to input into a predetermined function to generate the shared MAC address;
   generating, by the second MLAG peer, the shared MAC address, wherein the first MLAG peer and the second MLAG peer are members of a MLAG domain;
   publishing, by the first MLAG peer, a first route reachability message comprising the shared MAC address;
   publishing, by the second MLAG peer, a second route reachability message comprising the shared MAC address;
   after publishing the first route reachability message:
      receiving, by the first MLAG peer, an encapsulated NDU received via a network virtualization overlay (NVO) tunnel;
      decapsulating the encapsulated NDU to obtain an NDU, wherein the NDU comprises the shared MAC address;
      making, by the first MLAG peer, a first determination that a nexthop for the NDU is a network device, wherein the network device is not a member of the MLAG domain; and
      based on the first determination, transmitting the NDU to the network device.

2. The method of claim 1, wherein the first route reachability message is a Type 5 route comprising the shared MAC address.

3. The method of claim 1, wherein the NVO tunnel uses Virtual Extensible Local Area Network (VXLAN) protocol.

4. The method of claim 3, wherein the first MLAG peer comprises a virtual tunnel endpoint point (VTEP) and wherein the VTEP is associated with a shared VTEP Internet Protocol (IP) address.

5. The method of claim 1, wherein the shared MAC address is a unique MAC address in the MLAG domain.

6. The method of claim 1, further comprising:
   prior to generating, by the first MLAG peer, the shared MAC address:
   obtaining the second MAC address associated with the second MLAG peer.

7. The method of claim 1, wherein generating, by the second MLAG peer, the shared MAC address comprises:
   making a third determination that the first MAC address associated with the first MLAG peer is lower than the second MAC address associated with the second MLAG peer; and
   based on the third determination, generating the shared MAC address using the first MAC address.

8. The method of claim 7, further comprising:
   prior to generating, by the second MLAG peer, the shared MAC address:
   obtaining the first MAC address associated with the first MLAG peer.

9. A method for processing network data units (NDUs), the method comprising:
   generating, by a network device, a shared media access control (MAC) address, wherein the network device is a member of a multichassis link aggregation (MLAG) domain, and wherein generating the shared MAC address comprises:
      comparing a first MAC address associated with the network device to a second MAC address associated with a third network device, wherein the third network device is a member of the MLAG domain, and
      based on the results of the comparison, selecting one of the first and second MAC addresses to input into a predetermined function to generate the shared MAC address;
   publishing, by the network device, a route reachability message comprising the shared MAC address;
   after publishing the route reachability message:
      receiving, by the network device, an encapsulated NDU received via a network virtualization overlay (NVO) tunnel;
      decapsulating the encapsulated NDU to obtain an NDU, wherein the NDU comprises the shared MAC address;
      making, by the network device, a first determination that a nexthop for the NDU is a second network device, wherein the second network device is not a member of the MLAG domain; and
      based on the first determination, transmitting the NDU to the second network device.

10. The method of claim 9, wherein the shared MAC address is a unique MAC address in the MLAG domain.

11. The method of claim 9, further comprising:
    prior to generating, by the network device, the shared MAC address: obtaining the second MAC address associated with the third network device.

12. A network device, comprising:
    a processor; and
    memory comprising instructions, which when executed by the processor enable the network device to perform a method, the method comprising:
    generating a shared media access control (MAC) address, wherein the network device is a member of a multichassis link aggregation (MLAG) domain, and wherein generating the shared MAC address comprises:
       comparing a first MAC address associated with the network device to a second MAC address associated with a third network device, wherein the third network device is a member of the MLAG domain, and
       based on the results of the comparison, selecting one of the first and second MAC addresses to input into a predetermined function to generate the shared MAC address;
    publishing a route reachability message comprising the shared MAC address;
    after publishing the route reachability message:
       receiving an encapsulated NDU received via a network virtualization overlay (NVO) tunnel;
       decapsulating the encapsulated NDU to obtain an NDU, wherein the NDU comprises the shared MAC address;
       making a first determination that a nexthop for the NDU is a second network device, wherein the second network device is not a member of the MLAG domain; and based on the first determination, transmitting the NDU to the second network device.

13. The network device of claim 12, further comprising: prior to generating the shared MAC address: obtaining the second MAC address associated with the third network device.

* * * * *